United States Patent
Ashida et al.

(10) Patent No.: US 8,631,894 B2
(45) Date of Patent: Jan. 21, 2014

(54) ELECTRIC VEHICLE, AND CONTROL APPARATUS AND CONTROL METHOD FOR ELECTRIC VEHICLE

(75) Inventors: Shinjiro Ashida, Toyota (JP); Kenji Yamada, Kormaki (JP); Makoto Nakamura, Okazaki (JP); Tomoko Shimana, Nisshin (JP); Takaya Soma, Anjo (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 58 days.

(21) Appl. No.: 13/482,412

(22) Filed: May 29, 2012

(65) Prior Publication Data

US 2012/0309588 A1 Dec. 6, 2012

(30) Foreign Application Priority Data

May 30, 2011 (JP) .................................. 2011-121022

(51) Int. Cl.
*B60K 28/10* (2006.01)

(52) U.S. Cl.
USPC ........................................................ 180/274

(58) Field of Classification Search
USPC ............ 180/65.1, 65.21, 65.22, 65.285, 271, 180/274, 279; 701/22, 45
See application file for complete search history.

(56) References Cited

U.S. PATENT DOCUMENTS

2012/0039100 A1 2/2012 Hirose

FOREIGN PATENT DOCUMENTS

| JP | 11308704 A | 11/1999 |
| JP | 2005094883 A | 4/2005 |
| JP | 2005113760 A | 4/2005 |
| JP | 2006141158 A | 6/2006 |
| JP | 2007135400 A | 5/2007 |
| JP | 2010-093934 A | 4/2010 |
| JP | 2010-130845 A | 6/2010 |
| WO | 2010131353 A1 | 11/2010 |

*Primary Examiner* — Paul N Dickson
*Assistant Examiner* — Robert A Coker
(74) *Attorney, Agent, or Firm* — Gifford, Krass, Sprinkle, Anderson & Citkowski, P.C.

(57) ABSTRACT

An electric vehicle includes: a motor to propel the electric vehicle; a secondary battery that exchanges power with the motor via a power line; a capacitor that is connected to the power line; a collision detection unit that detects a collision of the electric vehicle; a rotation speed detection unit that detects a rotation speed of the motor; and a control unit that, when a collision of the electric vehicle is detected and the detected rotation speed of the motor equals or exceeds a predetermined rotation speed, controls the motor such that the rotation speed of the motor falls below the predetermined rotation speed and then executes discharge control to discharge the capacitor.

15 Claims, 6 Drawing Sheets

ELECTRIC VEHICLE, AND CONTROL APPARATUS AND CONTROL METHOD FOR ELECTRIC VEHICLE

CROSS REFERENCE TO RELATED APPLICATIONS

This application claims priority to Japanese Patent Application No. 2011-121022 filed on May 30, 2011, which is incorporated herein by reference in its entirety including the specification, drawings and abstract.

BACKGROUND OF THE INVENTION

1. Field of the Invention

The invention relates to an electric vehicle having a motor to propel the electric vehicle, a secondary battery that exchanges power with the motor via a power line, and a capacitor connected to the power line. The invention also relates to a control apparatus and a control method for the electric vehicle.

2. Description of Related Art

A vehicle including an alternating current motor to propel the vehicle, an inverter that converts direct current power into alternating current power and supplies the alternating current power to the motor, a storage device such as a secondary battery, a converter that boosts a voltage of the storage device and supplies the boosted voltage to the inverter, a relay capable of connecting and disconnecting the storage device to and from a power supply line that connects the converter and the inverter, and a smoothing capacitor connected to the power supply line on a high voltage side of the converter has been proposed in the related art as this type of electric vehicle (see WO2010/131353A1, for example). When a collision is detected in this vehicle, power generated by a residual charge of the capacitor is consumed by controlling the converter such that a voltage boosting operation and a voltage reducing operation are performed repeatedly, thereby increasing switching loss, or controlling the inverter such that only a field current component (a d axis current) is supplied to the motor, thereby increasing motor loss. At this time, discharge of the residual charge of the capacitor is promoted by reducing respective gate voltages of the inverter and the converter below normal levels in order to increase the switching loss of switching elements provided in the inverter and the converter.

A rotary shaft of the motor is normally coupled to a drive wheel via a gear mechanism, but when the vehicle is involved in a collision, a resulting impact may disconnect the coupling of the rotary shaft. As a result, the motor continues to rotate. In this case, a comparatively large counter-electromotive voltage is generated in the motor and charges accumulate in the capacitor. Accordingly, it may take a long time to discharge the residual charge of the capacitor completely.

SUMMARY OF THE INVENTION

The invention provides an electric vehicle that discharges a residual charge of a capacitor more quickly during a collision, as well as a control apparatus and a control method for the electric vehicle.

A first aspect of the invention is an electric vehicle including: a motor to propel the electric vehicle; a secondary battery that exchanges power with the motor via a power line; a capacitor that is connected to the power line; a collision detection unit that detects a collision of the electric vehicle; a rotation speed detection unit that detects a rotation speed of the motor; and a control unit that, when a collision of the electric vehicle is detected and the detected rotation speed of the motor equals or exceeds a predetermined rotation speed, controls the motor such that the rotation speed of the motor falls below the predetermined rotation speed and then executes discharge control to discharge the capacitor.

A second aspect of the invention is a control apparatus for an electric vehicle, including: a collision detection unit that detects a collision of the electric vehicle; a rotation speed detection unit that detects a rotation speed of a motor to propel the electric vehicle; and a control unit that, when a collision of the electric vehicle is detected and the detected rotation speed of the motor equals or exceeds a predetermined rotation speed, controls the motor such that the rotation speed of the motor falls below the predetermined rotation speed and then executes discharge control to discharge a capacitor connected to a power line on which the motor and a secondary battery of the electric vehicle exchange power.

A third aspect of the invention is a control method for an electric vehicle, including: detecting a collision of the electric vehicle; detecting a rotation speed of a motor to propel the electric vehicle; and when a collision of the electric vehicle is detected and the detected rotation speed of the motor equals or exceeds a predetermined rotation speed, controlling the motor such that the rotation speed of the motor falls below the predetermined rotation speed and then executing discharge control to discharge a capacitor connected to a power line on which the motor and a secondary battery of the electric vehicle exchange power.

According to the above configurations, when a collision of the electric vehicle is detected and the rotation speed of the motor equals or exceeds the predetermined rotation speed, the motor is controlled such that the rotation speed of the motor falls below the predetermined rotation speed, then the discharge control is executed to discharge the capacitor. In so doing, the capacitor is discharged in a condition where the rotation speed of the motor and a counter-electromotive voltage of the motor are both low, and therefore discharge can be completed in a shorter time than a time required to discharge the capacitor in a condition where the rotation speed of the motor and the counter-electromotive voltage of the motor are both high.

The control unit may control the motor such that the rotation speed of the motor decreases on a different gradient depending on a voltage of the capacitor. In this case, the gradient on which the rotation speed of the motor decreases may be reduced as the voltage of the capacitor increases. When the motor outputs torque for reducing the rotation speed thereof, the motor is regenerated, and as a result, charges accumulate in the capacitor. By reducing the rotation speed of the motor gently when the voltage of the capacitor is comparatively high, cumulative loss corresponding to the time required to reduce the rotation speed can be increased, and as a result, a voltage exceeding a withstand voltage can be prevented from acting on the capacitor.

Furthermore, the motor may be a three-phase alternating current motor, and the control unit may execute the discharge control by controlling the three-phase alternating current motor such that a field current flows the three-phase alternating current motor.

The electric vehicle may further include a relay that connects and disconnects the power line and the secondary battery, and when a collision is detected in the vehicle, the control unit may control the relay such that the secondary battery is disconnected from the power line.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
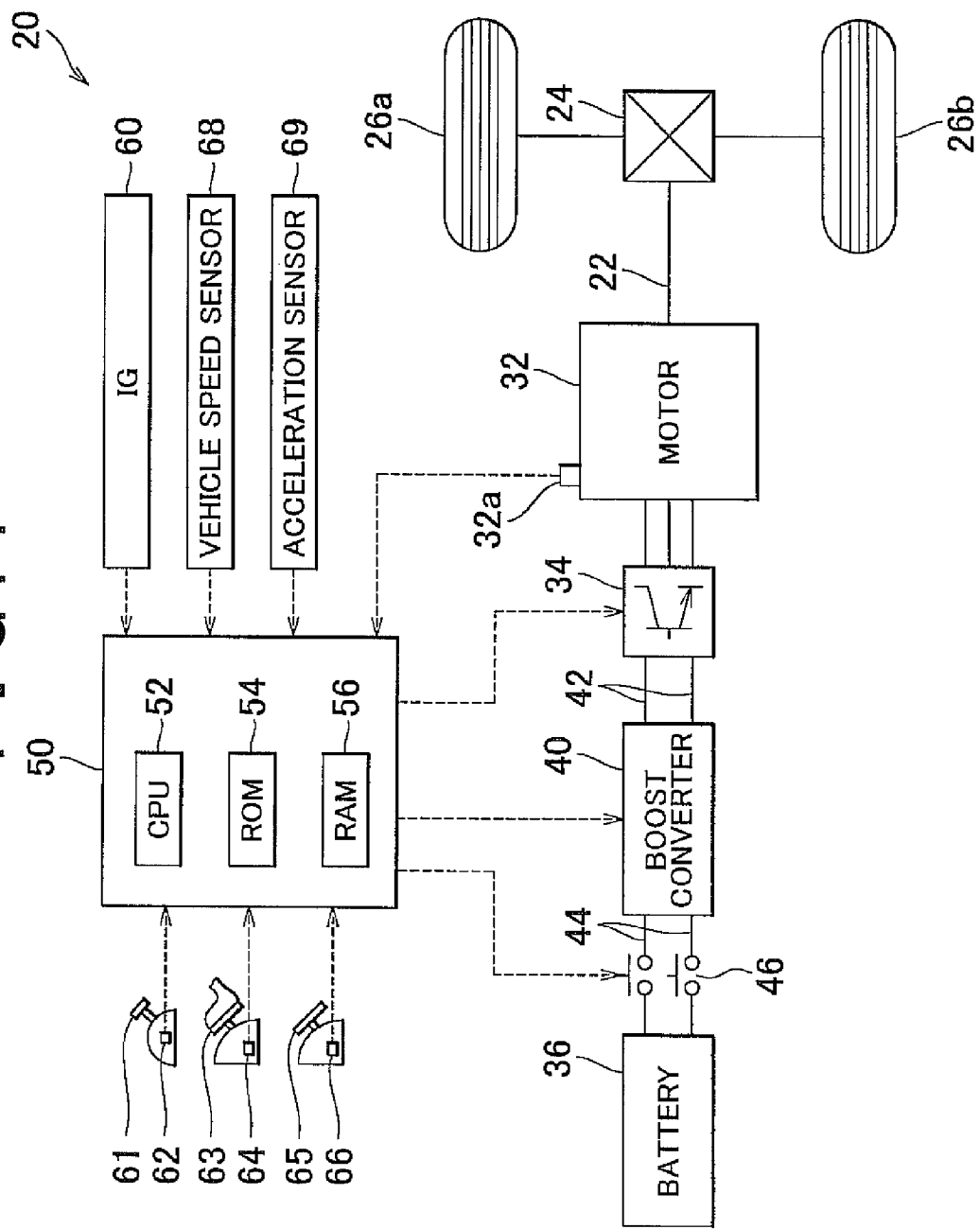
FIG. 1 is a schematic block diagram showing a configuration of an electric automobile 20 according to an embodiment of the invention.

An embodiment of the invention will be described below. FIG. 1 is a schematic block diagram showing a configuration of an electric automobile 20 according to an embodiment of the invention. As shown in the drawing, the electric automobile 20 according to this embodiment includes a motor 32, an inverter 34, a battery 36, a boost converter 40, a system main relay 46, and an electronic control unit 50. The motor 32 is constituted by a synchronous generator-motor, for example, and is capable of inputting and outputting power to and from a drive shaft 22. The drive shaft 22 is connected to drive wheels 26a, 26b via a differential gear 24. The inverter 34 is provided to drive the motor 32. The battery 36 is constituted by a lithium ion secondary battery, for example. The boost converter 40 is connected to a power line (referred to hereafter as a high voltage system power line) 42 to which the inverter 34 is connected and a power line (referred to hereafter as a battery voltage system power line) 44 to which the battery 36 is connected, and is used to boost a voltage of the battery voltage system power line 44 and supply the boosted voltage to the high voltage system power line 42. The system main relay 46 is attached to the battery voltage system power line 44 in order to connect and disconnect the battery voltage system power line 44 and the battery 36. The electronic control unit 50 controls the entire vehicle.

Figure 2:
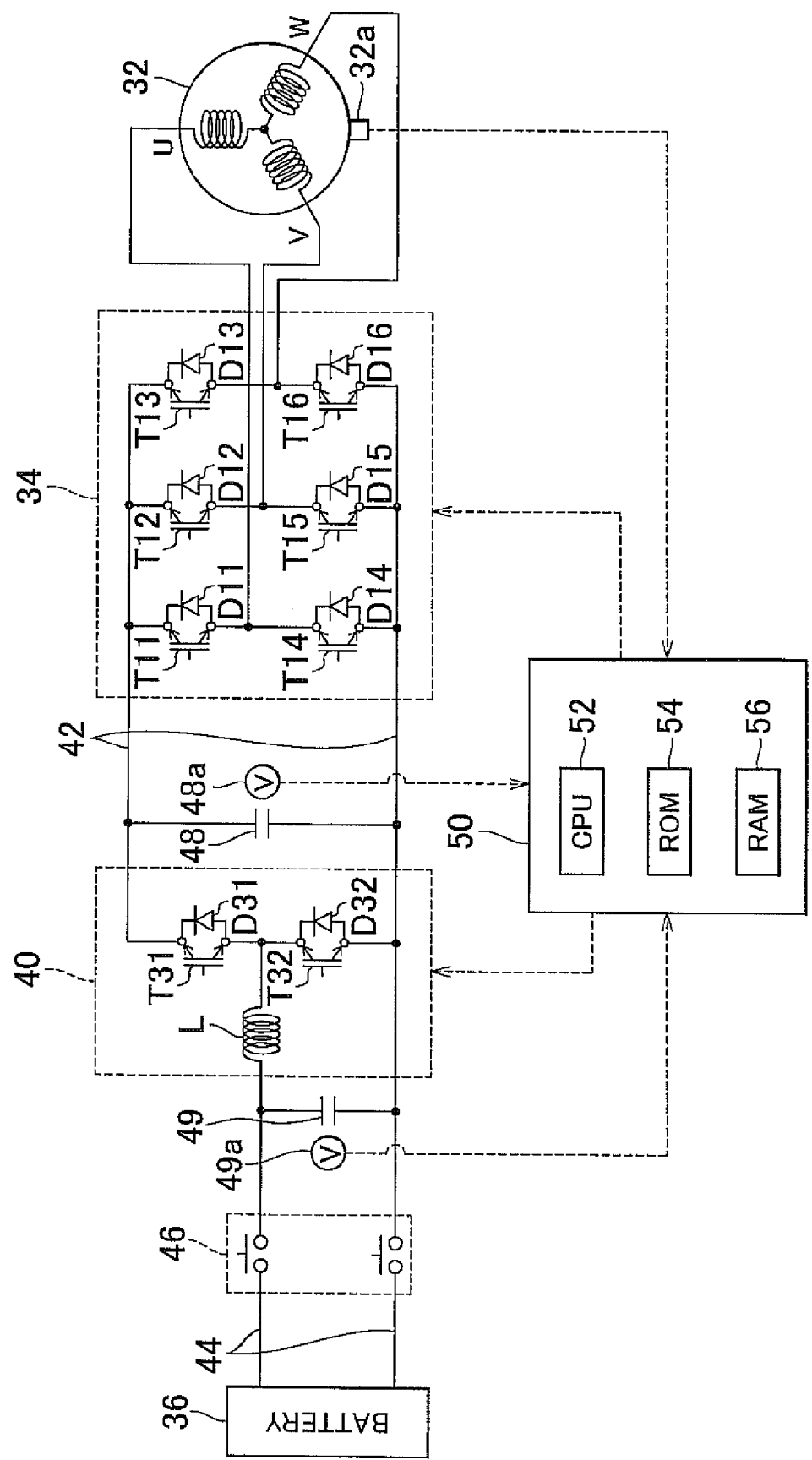
FIG. 2 is a block diagram showing an electric driving system mainly including a motor 32 and an inverter 34.

The motor 32 is constituted by a conventional synchronous generator-motor having a rotor in which a permanent magnet is embedded and a stator around which a three-phase coil is wound. The motor 32 generates a counter-electromotive voltage as it rotates. As shown in FIG. 2, which is a block diagram of an electric driving system mainly including the motor 32 and the inverter 34, the inverter 34 is constituted by six transistors T11 to T16 serving as switching elements, and six diodes D11 to D16 connected in parallel to the transistors T11 to T16 in an opposite direction to the transistors T11 to T16. The transistors T11 to T16 are disposed in pairs relative to a positive electrode bus line and a negative electrode bus line of the high voltage system power line 42. One of each pair of transistors serves as a source side transistor, and the other serves as a sink side transistor. A U phase coil, a V phase coil, and a W phase coil (the three-phase coils) of the motor 32 are connected to respective connecting points between the transistor pairs. Thus, by controlling ON time proportions of the transistors T11 to T16 while a voltage is applied to the inverter 34, a rotating magnetic field can be formed in the three-phase coils, and as a result, the motor 32 can be driven to rotate. A smoothing capacitor 48 is connected to the positive electrode bus line and the negative electrode bus line of the high voltage system power line 42.

As shown in FIG. 2, the boost converter 40 is constituted by two transistors T31, T32, two diodes D31, D32 connected in parallel to the transistors T31, T32 in an opposite direction to the transistors T31, T32, and a reactor L. The transistor T31 is connected to the positive electrode bus line of the high voltage system power line 42. The transistor T32 is connected to the negative electrode bus line of the high voltage system power line 42 and a negative electrode bus line of the battery voltage system power line 44. The reactor L is connected to a connecting point between the two transistors T31, T32. Further, a positive electrode terminal of the battery 36 is connected to the reactor L. A negative electrode terminal of the battery 36 is connected to the negative electrode bus lines of the high voltage system power line 42 and the battery voltage system power line 44. Hence, by ON/OFF controlling the transistors T31, T32, a power of the battery voltage system power line 44 can be boosted and supplied to the high voltage system power line 42 while a power of the high voltage system power line 42 can be reduced and supplied to the battery voltage system power line 44. A smoothing capacitor 49 is connected to the reactor L, the negative electrode bus lines of the high voltage system power line 42, and the battery voltage system power line 44.

The electronic control unit 50 is constituted by a microprocessor mainly including a central processing unit (CPU) 52. The electronic control unit 50 includes, in addition to the CPU 52, a read-only memory (ROM) 54 storing a processing program, a random access memory (RAM) 56 that stores data temporarily, and input/output ports, not shown in the drawing. A rotation position of the rotor of the motor 32, a phase current, an inter-terminal voltage Vb, a charge/discharge current, a battery temperature, a voltage (a voltage of the high voltage system power line 42) VH of the capacitor 48, a voltage (a voltage of the battery voltage system power line 44) VL of the capacitor 49, an ignition signal, a shift position SP, an accelerator depression amount Acc, a brake pedal position BP, a vehicle speed V, a vehicle acceleration α, and so on are input into the electronic control unit 50 via the input port. The rotation position of the rotor of the motor 32 is detected and output by a rotation position detection sensor 32a. The phase current is detected and output by a current sensor, not shown in the drawing, attached to a connecting line (a power line) between the motor 32 and the inverter 34. The inter-terminal voltage Vb is detected and output by a voltage sensor, not shown in the drawing, disposed between terminals of the battery 36. The charge/discharge current is detected and output by a current sensor, not shown in the drawing, attached to a power line connected to an output terminal of the battery 36. The battery temperature is detected and output by a temperature sensor, not shown in the drawing, attached to the battery 36. The voltage VH of the capacitor 48 is detected and output by a voltage sensor 48a attached between terminals of the capacitor 48. The voltage VL of the capacitor 49 is detected and output by a voltage sensor 49a attached between terminals of the capacitor 49. The ignition signal is output from an ignition switch 60. The shift position SP is output from a shift position sensor 62 that detects an operating position of a shift lever 61. The accelerator depression amount Acc is output from an accelerator pedal position sensor 64 that detects a depression amount of an accelerator pedal 63. The brake pedal position BP is output from a brake pedal position sensor 66 that detects a depression amount of a brake pedal 65. The vehicle speed V is detected and output by a vehicle speed sensor 68. The vehicle acceleration α is detected and output by an acceleration sensor 69 attached to the front of a vehicle body, for example. The electronic control unit 50 outputs switching control signals to the transistors T11 to T16 of the inverter 34, switching control signals to the transistors T31, T32 of the boost converter 40, and so on via the output port. Note that the electronic control unit 50 also calculates a rotation speed Nm of the motor 32 on the basis of the rotation position of the rotor of the motor 32, obtained from the rotation position detection sensor 32a.

Driving of the electric automobile 20 according to this embodiment, configured as described above, is controlled by a drive control routine, not shown in the drawings. In the drive control, switching of the transistors T11 to T16 of the inverter 34 are controlled such that the motor 32 is driven in accordance with a torque command Tm*, and switching of the transistors T31, T32 of the boost converter 40 are controlled such that the voltage VH of the high voltage system power line 42 reaches a target voltage VH*. At this time, a required torque Tr* to be output to the drive shaft 22 is set in accordance with the accelerator depression amount Acc from the accelerator pedal position sensor 64 and the vehicle speed V from the vehicle speed sensor 68, and the set required torque Tr* is set as the torque command Tm* to be output from the motor 32. Further, a voltage required to drive the motor 32 at an operating point on the basis of the set torque command Tm* and the rotation speed Nm is set as the target voltage VH* of the high voltage system power line 42.

Figure 3:
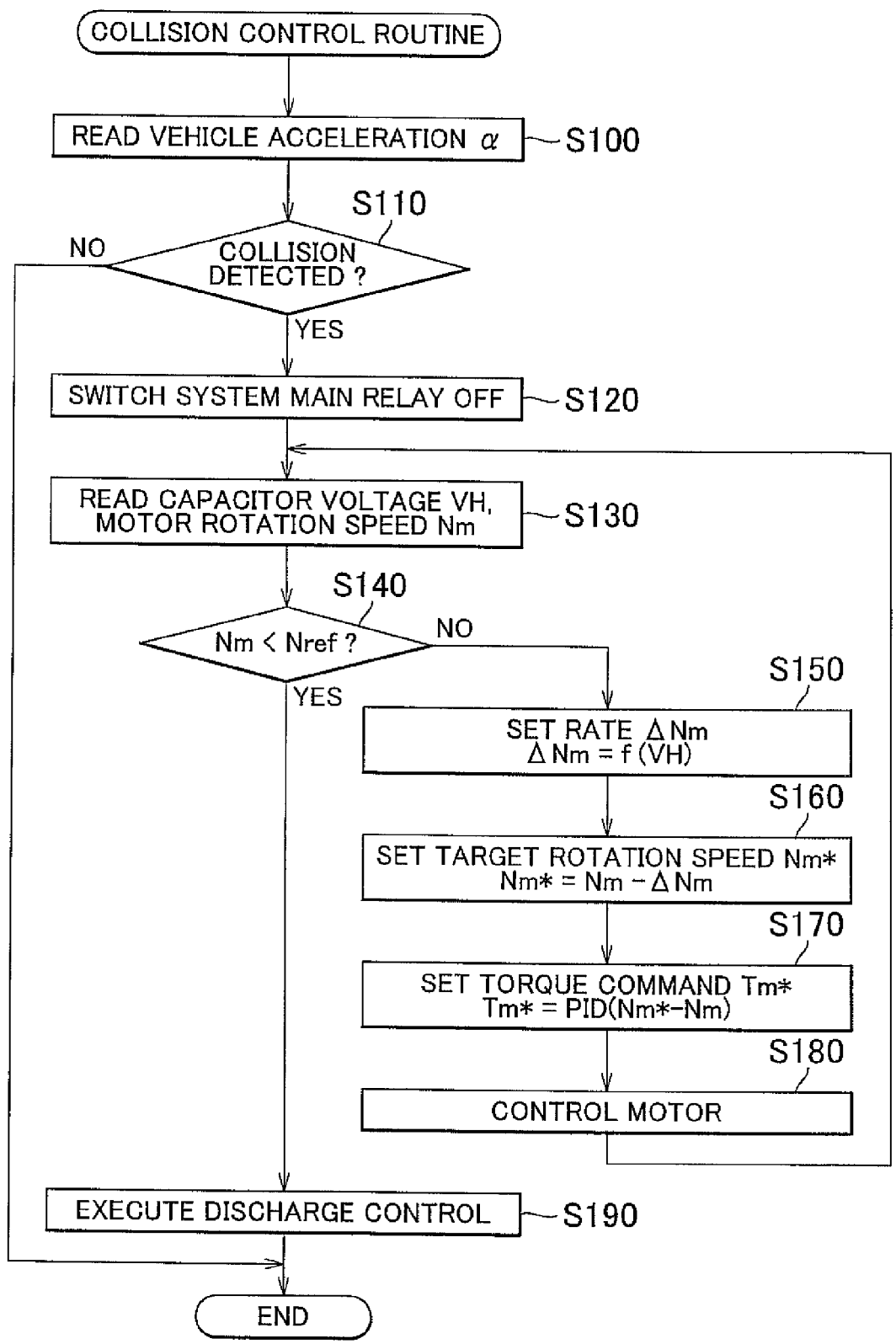
FIG. 3 is a flowchart showing an example of a control routine executed during a collision by an electronic control unit 50.

Next, an operation of the electric automobile 20 according to this embodiment, and in particular an operation performed during a vehicle collision, will be described. FIG. 3 is a flowchart showing an example of a control routine executed by the electronic control unit 50 during a collision. This routine is executed repeatedly at predetermined time intervals (intervals of several msec, for example).

When the collision control routine is executed, first, the CPU 52 of the electronic control unit 50 reads the vehicle acceleration α from the accelerator sensor 69 (Step S100) and compares the vehicle acceleration α with a collision determining acceleration threshold to detect that a collision has occurred in the vehicle (Step S110).

In this embodiment, a collision in the vehicle is detected if the vehicle acceleration α exceeds the collision determining acceleration threshold, for example. When a collision is not detected in the vehicle, the routine is terminated. When a collision is detected in the vehicle, the system main relay 46 is switched OFF (Step S120), whereupon the voltage VH of the capacitor 48, obtained from the voltage sensor 48a, and the rotation speed Nm of the motor 32 are read (Step S130). Note that a rotation speed calculated on the basis of the rotation position of the rotor of the motor 32, which is obtained from the rotation position detection sensor 32a, may be used as the rotation speed Nm of the motor 32.

Next, the rotation speed Nm of the motor 32 is compared with a rotation speed threshold Nref (Step S140). Here, the rotation speed threshold Nref is used to determine whether or not a counter-electromotive voltage has been generated in the motor 32, and is set at 50 rpm, 100 rpm, or the like, for example. Note that when a collision occurs in the vehicle, the motor 32 normally stops rotating as the vehicle (the drive wheels 26a, 26b) comes to a standstill. In a case where the drive shaft 22 is disconnected from the drive wheels 26a, 26b (the differential gear 24) by an impact generated during the collision, however, the motor 32 may continue to rotate alone. The processing of Step S140 is executed to determine whether or not the motor 32 continues to rotate alone in this manner. When the rotation speed Nm of the motor 32 equals or exceeds the rotation speed threshold Nref, it is determined that a counter-electromotive voltage has been generated in the motor 32, and therefore rotation speed control is executed to control driving of the motor 32 such that the rotation speed Nm of the motor 32 falls below the rotation speed threshold Nref. More specifically, the rotation speed control is performed on the motor 32 by executing processing of Steps S130 to S180 repeatedly until the rotation speed Nm falls below the rotation speed threshold Nref. In the processing of Steps S150 to S180, a rate ΔNm is set on the basis of the voltage VH of the capacitor 48 (Step S150), a value obtained by subtracting the rate ΔNm from the rotation speed Nm of the motor 32 is set as a target rotation speed Nm* of the motor 32 (Step S160), the torque command Tm* is set such that the rotation speed Nm reaches the set target rotation speed Nm* through feedback control (Step S170), and switching of the transistors T11 to T16 of the inverter 34 are controlled such that the motor 32 is driven in accordance with the torque command Tm*. Here, the rate ΔNm is set in accordance with a repetition time interval of Steps S130 to S180 so that the voltage VH of the capacitor 48 does not exceed a withstand voltage of the system. The rate ΔNm is set such that the rotation speed Nm of the motor 32 decreases within a range of 500 rpm per second to 1000 rpm per second, for example. In this embodiment, a relationship between the voltage VH of the capacitor 48 and the rate ΔNm is determined in advance and stored in the ROM 54 in the form of a map so that when the voltage VH is given, the corresponding rate ΔNm is derived from the map. Although not shown in the drawing, the map is created such that a decrease amount of the rotation speed Nm, or in other words the rate ΔNm, decreases as the voltage VH increases. To reduce the rotation speed Nm of the motor 32 below the rotation speed threshold Nref quickly, the rate ΔNm (the decrease amount of the rotation speed Nm) may be set as large as possible. When torque for reducing the rotation speed Nm is output from the motor 32, on the other hand, the motor 32 is regenerated, and therefore a charge is stored in the capacitor 48, leading to an increase in the voltage VH of the capacitor 48. At this time, a time required to reach the rotation speed threshold Nref increases as the rate ΔNm is reduced, and as a result, cumulative loss corresponding to the required time increases, thereby suppressing the increase in the voltage VH of the capacitor 48 is suppressed. Hence, by setting the rate ΔNm in accordance with the voltage VH of the capacitor 48, the rotation speed Nm of the motor 32 can be reduced below the rotation speed threshold Nref as quickly as possible within a range where the voltage VH of the capacitor 48 does not exceed the withstand voltage of the system.

When the rotation speed Nm of the motor 32 is determined to be lower than the rotation speed threshold Nref in Step S140, discharge control is executed to discharge a residual charge of the capacitor 48 (Step S190), whereupon the routine is terminated. Note that the discharge control is performed by controlling switching of the transistors T11 to T16 of the inverter 34 such that a field current (a d axis current) flows to the motor 32, controlling switching of the transistors T31, T32 such that the boost converter 40 performs a voltage boosting operation and a voltage reducing operation repeatedly, or reducing gate voltages of the transistors T11 to T16, T31, T32 to switch the inverter 34 and the boost converter 40.

Figure 4:
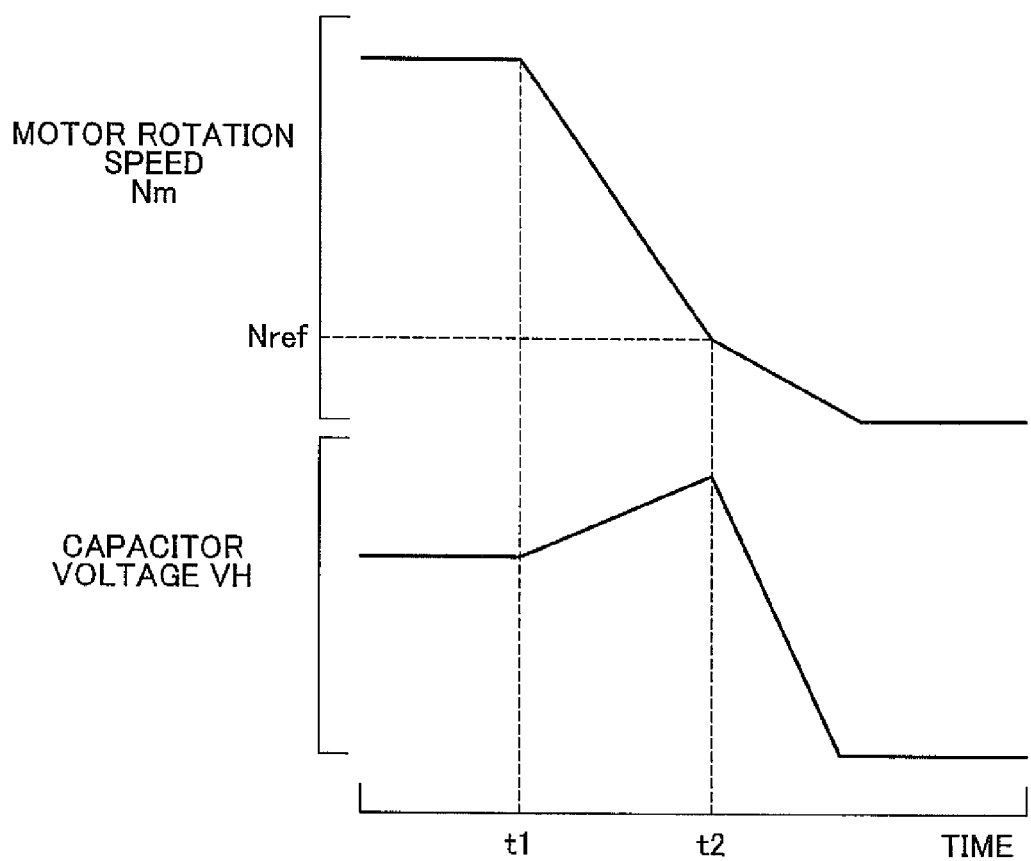
FIG. 4 is an illustrative view showing time variation in a motor rotation speed Nm2 and a capacitor voltage VH during a vehicle collision.

FIG. 4 shows time variation in a motor rotation speed Nm2 and a capacitor voltage VH (the voltage VH of the capacitor 48) during a vehicle collision. As shown in the drawing, when a vehicle collision is detected at a time t1, rotation speed control is executed on the motor 32 to reduce the rotation speed Nm of the motor 32 below the rotation speed threshold Nref. At this time, the motor 32 is regenerated, and therefore the capacitor voltage VH increases. However, the rate ΔNm for reducing the rotation speed Nm of the motor 32 is set within a range where the capacitor voltage VH does not exceed the withstand voltage of the system, and therefore defects do not occur in the capacitor 48 and the transistors T11 to T16, T31, T32. When the rotation speed Nm of the motor 32 falls below the rotation speed threshold Nref after a time t2, discharge control is executed, and as a result, the residual charge of the capacitor 48 is discharged quickly.

With the electric automobile 20 according to the embodiment described above, when the rotation speed Nm of the motor 32 equals or exceeds the rotation speed threshold Nref at the point where a vehicle collision is detected, a value obtained by subtracting the rate ΔNm from the rotation speed Nm of the motor 32 is set as the target rotation speed Nm* of the motor 32, and rotation speed control is executed to control driving of the motor 32 through feedback control such that the rotation speed Nm reaches the target rotation speed Nm*. When the rotation speed Nm of the motor 32 has fallen below the rotation speed threshold Nref as a result of the rotation speed control, discharge control of the capacitor 48 is started. Hence, effects from a counter-electromotive voltage generated in the motor 32 as it rotates can be eliminated, and as a result, the residual charge of the capacitor 48 can be discharged quickly. Furthermore, the rate ΔNm for reducing the rotation speed Nm of the motor 32 is set to decrease as the voltage VH of the capacitor 48 increases, and therefore the voltage VH of the capacitor 48 does not exceed the withstand voltage of the system when the rotation speed Nm of the motor 32 is reduced below the rotation speed threshold Nref.

In the electric automobile 20 according to this embodiment, the rate ΔNm for reducing the rotation speed Nm of the motor 32 is set to decrease as the voltage VH of the capacitor 48 increases. However, the rate ΔNm may be set in a stepped fashion so as to vary between two magnitude steps or the like in accordance with the magnitude of the voltage VH of the capacitor 48. Alternatively, the rate ΔNm may be set at a fixed value regardless of the voltage VH of the capacitor 48. In these cases also, the rate ΔNm is preferably set within a range where the voltage VH of the capacitor 48 does not exceed the withstand voltage of the system.

Figure 5:
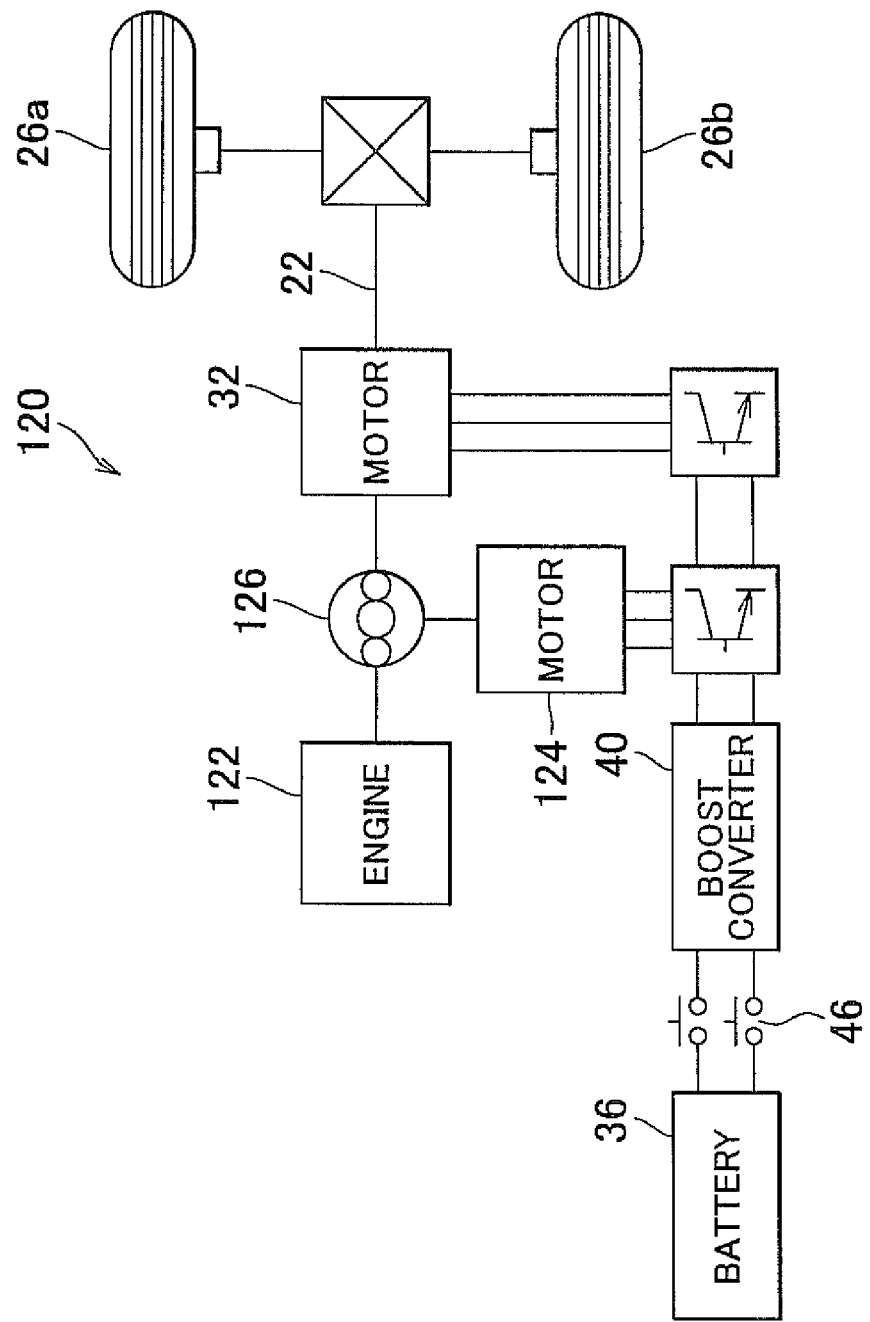
FIG. 5 is a schematic block diagram showing a configuration of a hybrid automobile 120 according to a first modified example.
Figure 6:
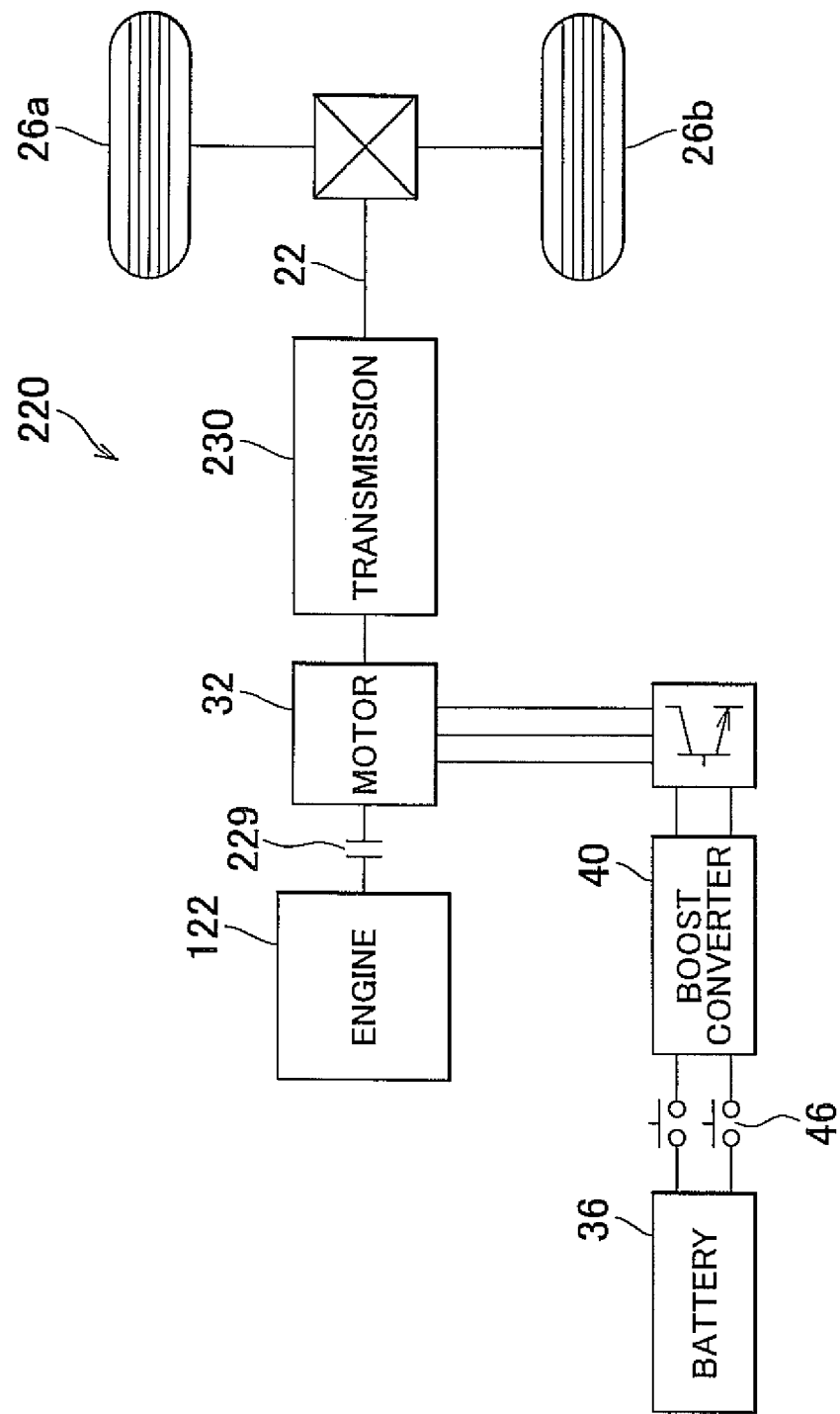
FIG. 6 is a schematic block diagram showing a configuration of a hybrid automobile 220 according to a second modified example.

The above embodiment was described using the electric automobile 20 including the motor 32 that is capable of inputting and outputting power to and from the drive shaft 22 connected to the drive wheels 26a, 26b and the inverter 34 for driving the motor 32, but the invention may also be applied to a hybrid automobile 120 according to a first modified example, as shown in FIG. 5, for example. The hybrid automobile 120 according to the first modified example includes an engine 122 and a motor 124 that are connected to the drive shaft 22 via a planetary gear mechanism 126, and the motor 32 capable of inputting and outputting power to and from the drive shaft 22. Further, the invention may be applied to a hybrid automobile 220 according to a second modified example shown in FIG. 6. In the hybrid automobile 220 according to the second modified example, the motor 32 is attached to the drive shaft 22 via a transmission 230 and the engine 122 is connected to a rotary shaft of the motor 32 via a clutch 229 such that power from the engine 122 is output to the drive shaft 22 via the rotary shaft of the motor 32 and power from the motor 32 is output to the drive shaft 22.

In the above embodiment, the motor 32 functions as a "motor", the battery 36 functions as a "secondary battery", the acceleration sensor 69 and the electronic control unit 50 that executes the processing of Steps S100 and S110 in the collision control routine of FIG. 3 function as a "collision detection unit", the rotation position detection sensor 32a and the electronic control unit 50 that calculates the rotation speed Nm on the basis of the rotation position of the motor 32 obtained from the rotation position detection sensor 32a function as a "rotation speed detection unit", and the electronic control unit 50 that executes the processing of Steps S120 to S190 in the collision control routine of FIG. 3 when a vehicle collision is detected functions as a "control unit". In the processing of Steps S120 to S190 in the collision control routine, which is executed when the rotation speed Nm of the motor 32 equals or exceeds the rotation speed threshold Nref until the rotation speed Nm falls below the rotation speed threshold Nref, the rate ΔNn$_1$ is set on the basis of the voltage VH of the capacitor 48, a value obtained by subtracting the rate ΔNm from the rotation speed Nm of the motor 32 is set as the target rotation speed Nm* of the motor 32, the torque command Tm* is set as the torque to be output from the motor 32 so that the rotation speed Nm reaches the set target rotation speed Nm* through the feedback control, rotation speed control is executed to control switching of the transistors T11 to T16 of the inverter 34 such that the motor 32 is driven in accordance with the torque command Tm*, and after the rotation speed control is complete, discharge control is executed to discharge the residual charge of the capacitor 48.

An embodiment of the invention was described above, but the invention is not limited in any way to this embodiment and may be implemented in various embodiments within a scope that does not depart from the spirit of the invention.

The invention may be used in the electric vehicle manufacturing industry and so on.

What is claimed is:

1. An electric vehicle comprising:
   a motor to propel the electric vehicle;
   a secondary battery that exchanges power with the motor through a power line;
   a capacitor that is connected to the power line;
   a collision detection unit that detects a collision of the electric vehicle;
   a rotation speed detection unit that detects a rotation speed of the motor; and
   a control unit that, when a collision of the electric vehicle is detected and the detected rotation speed of the motor equals or exceeds a predetermined rotation speed, controls the motor such that the rotation speed of the motor falls below the predetermined rotation speed and then executes discharge control to discharge the capacitor.

2. The electric vehicle according to claim 1, wherein the control unit controls the motor such that the rotation speed of the motor decreases on a different gradient depending on a voltage of the capacitor.

3. The electric vehicle according to claim 2, wherein the gradient on which the rotation speed of the motor decreases is reduced as the voltage of the capacitor increases.

4. The electric vehicle according to claim 1, wherein the motor is a three-phase alternating current motor, and
   the control unit executes the discharge control by controlling the three-phase alternating current motor such that a field current flows to the three-phase alternating current motor.

5. The electric vehicle according to claim 1, further comprising:
   a relay that connects and disconnects the power line and the secondary battery,
   wherein, when a collision of the vehicle is detected, the control unit controls the relay such that the secondary battery is disconnected from the power line.

6. A control apparatus for an electric vehicle, comprising:
a collision detection unit that detects a collision of the electric vehicle;
a rotation speed detection unit that detects a rotation speed of a motor used to propel the electric vehicle; and
a control unit that, when a collision of the electric vehicle is detected and the detected rotation speed of the motor equals or exceeds a predetermined rotation speed, controls the motor such that the rotation speed of the motor falls below the predetermined rotation speed and then executes discharge control to discharge a capacitor connected to a power line through which the motor and a secondary battery of the electric vehicle exchange power.

7. The control apparatus for the electric vehicle according to claim 6, wherein the control unit controls the motor such that the rotation speed of the motor decreases on a different gradient depending on a voltage of the capacitor.

8. The control apparatus for the electric vehicle according to claim 7, wherein the gradient on which the rotation speed of the motor decreases is reduced as the voltage of the capacitor increases.

9. The control apparatus for the electric vehicle according to claim 6, wherein the motor is a three-phase alternating current motor, and
the control unit executes the discharge control by controlling the three-phase alternating current motor such that a field current flows to the three-phase alternating current motor.

10. The control apparatus for the electric vehicle according to claim 6, wherein when a collision of the vehicle is detected, the control unit controls a relay that connects and disconnects the power line and the secondary battery such that the secondary battery is disconnected from the power line.

11. A control method for an electric vehicle, comprising:
detecting a collision of the electric vehicle;
detecting a rotation speed of a motor to propel the electric vehicle; and
when a collision of the electric vehicle is detected and the detected rotation speed of the motor equals or exceeds a predetermined rotation speed, controlling the motor such that the rotation speed of the motor falls below the predetermined rotation speed and then executing discharge control to discharge a capacitor connected to a power line through which the motor and a secondary battery of the electric vehicle exchange power.

12. The control method for the electric vehicle according to claim 11, wherein the motor is controlled such that the rotation speed of the motor decreases on a different gradient depending on a voltage of the capacitor.

13. The control method for the electric vehicle according to claim 12, wherein the gradient on which the rotation speed of the motor decreases is reduced as the voltage of the capacitor increases.

14. The control method for the electric vehicle according to claim 11, wherein the motor is a three-phase alternating current motor, and
the discharge control is executed by controlling the three-phase alternating current motor such that a field current flows to the three-phase alternating current motor.

15. The control method for the electric vehicle according to claim 11, further comprising when a collision of the vehicle is detected, controlling a relay that connects and disconnects the power line and the secondary battery such that the secondary battery is disconnected from the power line.

* * * * *